US012630675B2

(12) United States Patent
Sakai et al.

(10) Patent No.: US 12,630,675 B2
(45) Date of Patent: May 19, 2026

(54) POLYIMIDE RESIN COMPOSITION

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 774 days.

(21) Appl. No.: 17/435,442

(22) PCT Filed: Mar. 5, 2020

(86) PCT No.: PCT/JP2020/009296
§ 371 (c)(1),
(2) Date: Sep. 1, 2021

(87) PCT Pub. No.: WO2020/184355
PCT Pub. Date: Sep. 17, 2020

(65) Prior Publication Data

US 2022/0056214 A1 Feb. 24, 2022

(30) Foreign Application Priority Data

Mar. 14, 2019 (JP) ................................ 2019-047561

(51) Int. Cl.
*C08G 73/10* (2006.01)
*C08K 13/02* (2006.01)
*C08K 3/16* (2006.01)
*C08K 5/00* (2006.01)

(52) U.S. Cl.
CPC ..... *C08G 73/1082* (2013.01); *C08G 73/1042* (2013.01); *C08K 13/02* (2013.01); *C08K 3/16* (2013.01); *C08K 5/005* (2013.01)

(58) Field of Classification Search
CPC ........... C08G 73/1042; C08G 73/1082; C08K 5/005; C08K 3/014; C08K 3/16; C08K 3/22; C08K 5/098; C08K 2003/2213
See application file for complete search history.

(56) References Cited

U.S. PATENT DOCUMENTS

| | | | | |
|---|---|---|---|---|
| 9,045,636 B2 * | 6/2015 | Gallucci | C08K 3/16 525/419 | |
| 2015/0209993 A1 * | 7/2015 | Nadella | B29C 47/10 | |
| 2016/0108174 A1 | 4/2016 | Jeol et al. | | |
| 2016/0177062 A1 | 6/2016 | Sato et al. | | |
| 2017/0130003 A1 | 5/2017 | Sato | | |
| 2017/0275425 A1 | 9/2017 | Sato | | |

FOREIGN PATENT DOCUMENTS

| | | | | |
|---|---|---|---|---|
| CN | 106633918 | * 5/2017 | C08K 5/5425 | |
| EP | 3 031 864 A1 | 6/2016 | | |
| JP | 64-1763 A | 1/1989 | | |
| JP | 2005-28524 A | 2/2005 | | |
| KR | 20110086663 A | * 7/2011 | C04B 28/24 | |
| WO | WO2004000921 | * 12/2003 | C08K 5/00 | |
| WO | WO 2016/147996 A1 | 9/2016 | | |
| WO | WO 2016/147997 A1 | 9/2016 | | |
| WO | WO 2018/100324 A1 | 6/2018 | | |

OTHER PUBLICATIONS

CN106633918A English Translation (Year: 2017).*
KR20110086663A English (Year: 2011).*
International Search Report issued May 19, 2020 in PCT/JP2020/009296 filed Mar. 5, 2020, 2 page.
Zhenping Shang et al., "Studies on syntheses and properties of novel $CeO_2$/polyimide nanocomposite films from $Ce(Phen)_3$ complex", Polymer 48 (2007), pp. 4041-4046.

* cited by examiner

*Primary Examiner* — Catherine S Branch
*Assistant Examiner* — Huihong Qiao
(74) *Attorney, Agent, or Firm* — Oblon, McClelland, Maier & Neustadt, L.L.P.

(57) ABSTRACT

A polyimide resin composition containing a polyimide resin (A) and an antioxidant (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the antioxidant (B) contains one or more copper compounds (B1) selected from the group consisting of copper fluoride, copper bromide, copper iodide, and copper carboxylates, or a cerium-containing compound (B2);

(1)

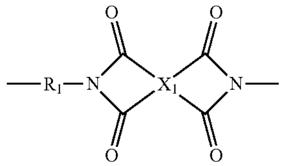

(2)

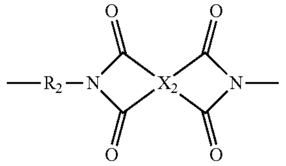

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

9 Claims, No Drawings

POLYIMIDE RESIN COMPOSITION

CROSS-REFERENCE TO RELATED APPLICATIONS

The present application is a 35 U.S.C. § 371 national stage application of International patent application PCT/JP2020/009296, filed Mar. 5, 2020, which is based on and claims the benefit of priority to Japanese Application No. 2019-047561, filed Mar. 14, 2019. The entire contents of these applications are incorporated herein by reference.

TECHNICAL FIELD

The present invention relates to a polyimide resin composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

Improvement of the heat aging resistance of thermoplastic polyimide resins also has been contemplated. For example, PTL 2 states that a polyimide resin having a particular polyimide structural unit and having a chain aliphatic group having from 5 to 14 carbon atoms at the end thereof is excellent in molding processability, heat resistance, and heat aging resistance. PTL 2 further states that a polyimide resin composition may be produced by adding an additive such as an antioxidant to the polyimide resin.

CITATION LIST

Patent Literature

PTL 1: JP-A-2005-28524

PTL 2: WO2016/147997

SUMMARY OF INVENTION

Technical Problem

Although the heat aging resistance of films after 72 hours passed at 200° C. are evaluated in PTL2, required is a material that does not heat aged, even if subjected to a high-temperature condition for a longer period, and is excellent in long-term heat resistance.

The polyimide resin described in PTL 2 is a crystalline thermoplastic resin. In crystalline thermoplastic resins, a further increase in the crystallization temperature causes the heat resistance to increase, further enables the molding cycle on heat molding to be shortened, and thus is also advantageous from the viewpoint of productivity on molding processing.

An object of the present invention is to provide a thermoplastic polyimide resin composition having excellent long-term heat resistance, a high crystallization temperature, and good molding processability.

Solution to Problem

The present inventors have found that the aforementioned object can be attained by a polyimide resin composition containing a polyimide resin containing particular different polyimide structural units combined at a particular ratio and a particular antioxidant.

That is, the present invention provides a polyimide resin composition containing a polyimide resin (A) and an antioxidant (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the antioxidant (B) contains one or more copper compounds (B1) selected from the group consisting of copper fluoride, copper bromide, copper iodide, and copper carboxylates, or a cerium-containing compound (B2);

(1)

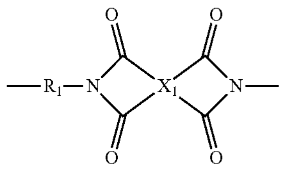

(2)

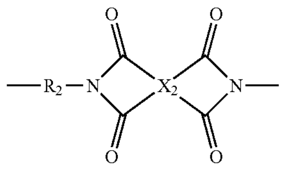

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

Advantageous Effects of Invention

The polyimide resin composition of the present invention has excellent long-term heat resistance and a high crystallization temperature and thus also has good molding processability and productivity on heat molding. The polyimide resin composition of the present invention can be applied, for example, in various industrial members, enclosures for industrial machines, members for communication devices, members for household electrical products such as gears, bearings, screws, nuts, packings, IC sockets for inspection, belts and enclosures, covering materials for electrical wire and the like, cover-lay films, members for automobiles, members for railway, aviation applications, medical instruments, enclosures for fishing rods, reels, and the like, stationery, and the like.

DESCRIPTION OF EMBODIMENTS

[Polyimide Resin Composition]

The polyimide resin composition of the present invention is a polyimide resin composition containing a polyimide resin (A) and an antioxidant (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the antioxidant (B) contains one or more copper compounds (B1) selected from the group consisting of copper fluoride, copper bromide, copper iodide, and copper carboxylates, or a cerium-containing compound (B2):

(1)

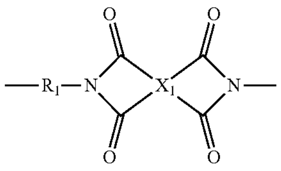

(2)

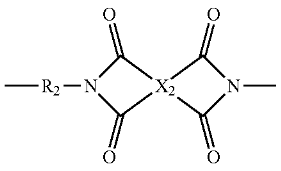

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

The polyimide resin composition of the present invention contains the polyimide resin (A) containing particular different polyimide structural units combined at a particular ratio described above to be a resin composition that develops thermoplasticity and is excellent in molding processability. Combination of the polyimide resin (A) and the antioxidant containing the particular copper compound (B1) or cerium-containing compound (B2) enables the crystallization temperature to increase, allows moldability and heat resistance to be improved, and additionally allows the long-term heat resistance of the resulting molded article to be markedly improved.

<Polyimide Resin (A)>

The polyimide resin (A) used in the present invention contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

(1)

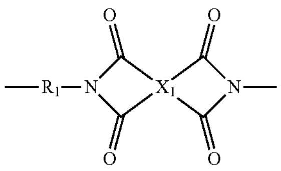

(2)

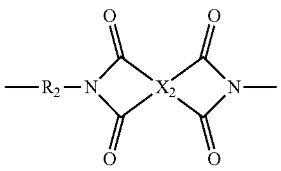

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

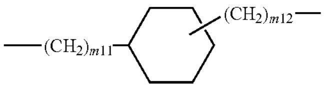

(R1-2)

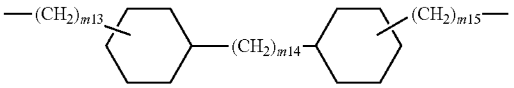

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

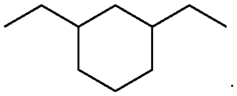

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

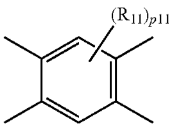

(X-2)

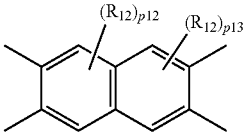

(X-3)

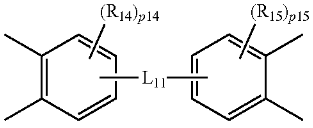

-continued (X-4)

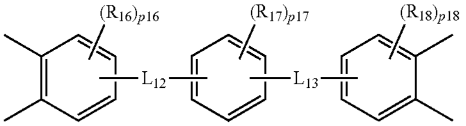

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring and therefore $R_{12}$, $R_{13}$, $p_{12}$, and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$, and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$, and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

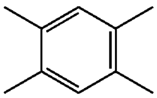

(X-6)

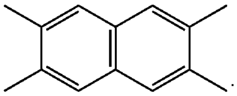

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$-(CH_2)_{m21}-O-(CH_2)_{m22}- \quad \text{(R2-1)}$$

$$-(CH_2)_{m23}-O-(CH_2)_{m24}-O-(CH_2)_{m25}- \quad \text{(R2-2)}$$

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the content ratio falls within this range, the crystallinity of the polyimide resin (A) increases, and thus, a resin composition more excellent in heat resistance can be obtained.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

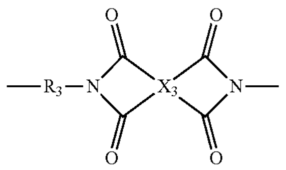

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., $-C(CF_3)_2-$ and $-(CF_2)_p-$ (wherein p is an integer of 1-10)), as well as $-CO-$, $-SO_2-$, $-SO-$, $-CONH-$, and $-COO-$.

$R_3$ is preferably a divalent group represented by the following formula (R3-1) or (R3-2):

(R3-1)

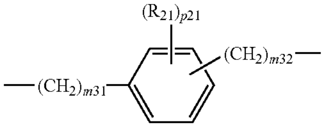

(R3-2)

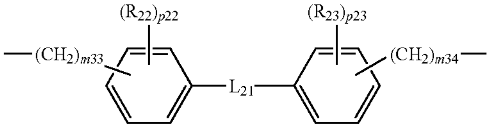

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

(4)

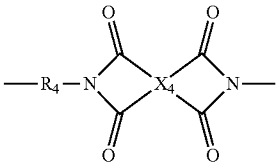

wherein $R_4$ represents a divalent group containing $-SO_2-$ or $-Si(R_x)(R_y)O-$; $R_x$ and $R_y$ each independently represent a chain aliphatic group having from 1 to 3 carbon atoms, or a phenyl group; and $X_1$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exerting excellent heat aging resistance. In order that a sufficient molecular weight is ensured and good mechanical properties are achieved, the content of the chain aliphatic group having from 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin (A) is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin (A) can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin (A) at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization of the polyimide resin (A) is not particularly limited, and is usually 45.0 mJ/mg or less.

Specifically, the melting point, the glass transition temperature, and the exothermic amount of crystallization of the polyimide resin (A) can be measured by the methods described in Examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity μ is obtained according to the following expression by measuring the elapsed times for flowing concentrated sulfuric acid and the polyimide resin solution at 30° C. with a Cannon-Fenske viscometer.

$$\mu=\ln(ts/t_0)/C$$

$t_0$: elapsed time for flowing concentrated sulfuric acid
ts: elapsed time for flowing polyimide resin solution
C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength is good, and when the Mw is 150,000 or less, the molding processability is good.

The weight average molecular weight Mw of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.$0^{2,6}$]decane, 3,3'-dimethyl-4,4'-diaminodicyclohexylmethane, and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-dilsopropylbenzene, α,α'-bis(3-aminophenyl)-1,4-dilsopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin (A).

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among these, the monoamine end capping agent is preferable as the end capping agent, and a monoamine containing a chain aliphatic group having from 5 to 14 carbon atoms is more preferable and a monoamine containing a saturated linear aliphatic group having from 5 to 14 carbon atoms is further preferable from the viewpoint of introduction of the chain aliphatic group having from 5 to 14 carbon atoms into the end of the polyimide resin (A) for enhancement of heat aging resistance.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO2016/147996 may be employed.

<Antioxidant (B)>

The polyimide resin composition of the present invention contains the polyimide resin (A) and the antioxidant (B) containing one or more copper compounds (B1) selected from the group consisting of copper fluoride, copper bromide, copper iodide, and copper carboxylates, or a cerium-containing compound (B2). Addition of the antioxidant (B) containing a particular copper compound (B1) or cerium-containing compound (B2) to the polyimide resin (A) having the particular structure enables the crystallization temperature to increase, allows moldability and heat resistance to be improved, and additionally allows the long-term heat resistance of the resulting molded article to be markedly improved.

(Copper Compound (B1))

A case where the antioxidant (B) contains a particular copper compound (B1) will be described below.

Among copper fluoride, copper bromide, and copper iodide as copper halides of copper compounds (B1), copper bromide and copper iodide are preferred, and copper iodide is more preferred. From the viewpoint of an antioxidant effect, the valence of copper in these copper halides is preferably monovalent. For example, it is preferred that copper bromide be copper bromide (I) (CuBr) and copper iodide be copper iodide (I) (CuI).

Examples of copper carboxylates include salts of copper and a monocarboxylic acid having from 1 to 24 carbon atoms, preferably from 2 to 18 carbon atoms, and examples of specific compounds include copper acetate, copper laurate, and copper stearate. These can each be used alone or can be used in combinations of two or more thereof.

Among those described above, from the viewpoint of obtaining an effect of increasing the crystallization temperature and long-term heat resistance, as the component (B1), one or two selected from the group consisting of copper bromide and copper iodide are preferred, and copper iodide is more preferred.

The content of the component (B1) in the polyimide resin composition of the present invention is preferably 0.001 to 0.3 mass %, more preferably 0.002 to 0.2 mass %, further preferably 0.005 to 0.1 mass %, and still further preferably 0.01 to 0.05 mass %. When the content of the component (B1) in the polyimide resin composition is 0.001 mass % or more, the effect of increasing the crystallization temperature and long-term heat resistance are good. When the content is 0.3 mass % or less, deposition of the component (B1) is unlikely to occur, and the hue and mechanical properties derived from the component (A) are likely to be maintained.

Since the component (B1) itself has an antioxidant effect, the component (B) may be constituted only of the component (B1) or may be constituted with an antioxidant component other than the component (B1) contained.

The content of the component (B1) in the component (B) is not particularly limited, as long as the content of the component (B1) in the polyimide resin composition is preferably in the range, and is preferably 0.5 mass % or more, more preferably 1 mass % or more, further preferably 5 mass % or more, and still further preferably 8 mass % or more. The upper limit of the content of the component (B1) in the component (B) is 100 mass %, preferably 80 mass % or less, more preferably 60 mass % or less, further preferably 50 mass % or less, and still further preferably 30 mass % or less. When the content of the component (B1) in the component (B) is 0.5 mass % or more and preferably 1 mass % or more, the hue is likely to be good.

When the component (B) contains the component (B1), as an antioxidant component other than the component (B1) in the component (B), from the viewpoint of suppressing the deposition of the component (B1) and obtaining to obtain an effect of increasing the crystallization temperature and long-term heat resistance, one or more selected from the group consisting of halides of a metal other than copper and carboxylates of a metal other than copper are preferred, containing a carboxylate of a metal other than copper is more preferred, and use of a halide of a metal other than copper and a carboxylate of a metal other than copper in combination is further preferred.

As the halide of a metal other than copper, from the viewpoint of suppressing the deposition of the component (B1) and obtaining an effect of increasing the crystallization temperature and long-term heat resistance, a halide of an alkali metal is preferred, potassium halide is more preferred, one or more selected from the group consisting of potassium bromide and potassium iodide is further preferred, and potassium iodide is still further preferred.

As the carboxylate of a metal other than copper, a salt of a metal other than copper and a fatty acid is preferred, and from the viewpoint of heat resistance, a salt of a polyvalent metal other than copper and a fatty acid is more preferred.

Examples of the polyvalent metal other than copper include lithium, calcium, magnesium, barium, aluminum, titanium, iron, and zinc. The polyvalent metal other than copper is preferably one or more selected from the group consisting of calcium, magnesium, barium, iron, and zinc and more preferably one or more selected from the group consisting of iron, and zinc, and further preferably zinc.

Examples of the fatty acid include saturated or unsaturated fatty acids having preferably from 8 to 24 carbon atoms, more preferably from 10 to 18 carbon atoms, and further preferably from 12 to 18 carbon atoms from the viewpoint of the heat resistance, and a saturated fatty acid is preferred. Specific examples of the fatty acid include octylic acid, decanoic acid, lauric acid, ricinoleic acid, myristic acid, palmitic acid, palmitoleic acid, stearic acid, oleic acid, linoleic acid, erucic acid, and behenic acid. One or more selected from lauric acid, myristic acid, palmitic acid, and stearic acid are preferred, one or more selected from the group consisting of lauric acid and stearic acid are more preferred, and stearic acid is further preferred.

Specific examples of the carboxylate of a metal other than copper include zinc octylate, calcium laurate, barium laurate, zinc laurate, magnesium stearate, calcium stearate, barium stearate, iron stearate, zinc stearate, calcium ricinoleate, barium ricinoleate, and zinc ricinoleate. These can each be used alone or can be used in combinations of two or more thereof. In particular, one or more selected from the group consisting of calcium laurate, barium laurate, zinc laurate, magnesium stearate, calcium stearate, barium stearate, iron stearate, and zinc stearate are preferred, one or more selected from the group consisting of magnesium stearate, calcium stearate, barium stearate, iron stearate, and zinc stearate are more preferred, one or more selected from the group consisting of iron stearate and zinc stearate are further preferred, and zinc stearate is still further preferred.

When the component (B) contains the component (B1), from the viewpoint of obtaining an effect of increasing the crystallization temperature and long-term heat resistance, the component (B) is preferably configured to contain copper iodide as the component (B1) and further contain a carboxylate of a metal other than copper as an antioxidant component other than the component (B1). The component (B) is more preferably configured to contain copper iodide as the component (B1) and further contain a halide of a metal other than copper and a carboxylate of a metal other than copper as an antioxidant component other than the component (B1), and is further preferably configured to comprise copper iodide, a halide of a metal other than copper, and a carboxylate of a metal other than copper.

The halide of a metal other than copper, the carboxylate of a metal other than copper, and preferred forms of these are as described above.

Further preferably, the component (B) is in a form comprising copper iodide, potassium halide, and one or more selected from the group consisting of iron stearate and zinc stearate, still further preferably the component (B) is in a form comprising one or more selected from the group consisting of copper iodide, potassium bromide, and potassium iodide, and zinc stearate, and still further preferably, the component (B) is a form comprising copper iodide, potassium iodide, and zinc stearate.

When the component (B) contains copper iodide, a halide of a metal other than copper, and a carboxylate of a metal other than copper, the ratio of these is preferably in the following range, from the viewpoint of obtaining an effect of increasing the crystallization temperature and long-term heat resistance.

The ratio of copper iodide: the halide of a metal other than copper by mass is in the range of preferably 1:1 to 1:20, more preferably 1:2 to 1:15, and further preferably 1:3 to 1:10.

The ratio of copper iodide: the carboxylate of a metal other than copper by mass is in the range of preferably 1:0.1 to 1:10, more preferably 1:0.2 to 1:5, further preferably 1:0.4 to 1:2, and further preferably 1:0.84 to 1:2.

(Cerium-Containing Compound (B2))

A case where the antioxidant (B) contains a cerium-containing compound (B2) will be described below.

As the cerium-containing compound (B2), one or more selected from the group consisting of cerium oxide, cerium carbonate, cerium nitrate, cerium chloride, cerium hydroxide, and hydrates thereof are preferred. In particular, one or more selected from the group consisting of cerium oxide, cerium hydroxide, and hydrates thereof are preferred, and one or more selected from the group consisting of cerium oxide ($CeO_2$) and hydrates thereof are further preferred.

When the cerium-containing compound (B2) is a cerium oxide hydrate, the content of cerium oxide in the cerium oxide hydrate is preferably 70 to 99 mass %, more preferably 80 to 99%, and further preferably 85 to 96 mass %.

The valence of cerium in the component (B2) is preferably tetravalent from the viewpoint of the antioxidant effect.

When the component (B) contains the component (B2), the content of the component (B2) in the polyimide resin composition of the present invention is preferably 0.05 to 18 mass %, more preferably 0.5 to 15 mass %, further preferably 2 to 13 mass %, and still further preferably 5 to 13 mass %. When the content of the component (B2) in the polyimide resin composition is 0.05 mass % or more, the effect of increasing the crystallization temperature and long-term heat resistance are good. When the content is 18 mass % or less, deposition of the component (B2) is unlikely to occur, and the hue and mechanical properties derived from the component (A) are likely to be maintained.

When the component (B2) contains a hydrate, the weight of the hydrated water is considered not to be included in the amount of the component (B2).

Since the component (B2) itself has an antioxidant effect, the component (B) may be constituted only of the component (B2) or may be constituted with an antioxidant component other than the component (B2) contained.

When the component (B) contains the component (B2), the content of the component (B2) in the component (B) is not particularly limited as long as the content of the component (B2) in the polyimide resin composition is preferably in the range, and is preferably 50 mass % or more, more preferably 60 mass % or more, further preferably 70 mass % or more, and still further preferably 80 mass % or more. The upper limit of the content of the component (B2) in the component (B) is 100 mass %.

As the antioxidant component other than the component (B2) in the component (B), from the viewpoint of suppressing the deposition of the component (B2) and obtaining an effect of increasing the crystallization temperature and long-term heat resistance, a hydroxide of a metal other than cerium is preferably contained.

As the hydroxide of a metal other than cerium, from the viewpoint of suppressing the deposition of the component (B2) and obtaining an effect of increasing the crystallization temperature and long-term heat resistance, a hydroxide of an alkali earth metal is preferred, magnesium hydroxide and calcium hydroxide are more preferred, and calcium hydroxide is further preferred.

When the component (B) contains the component (B2), from the viewpoint of obtaining an effect of increasing the crystallization temperature and long-term heat resistance, the component (B) may be configured to contain one or more selected from the group consisting of cerium oxide, cerium hydroxide, and hydrates thereof as the component (B2) and further contain a hydroxide of a metal other than cerium as an antioxidant other than the component (B2). Still further, the component (B) may be configured to comprise one or more selected from the group consisting of cerium oxide and hydrates thereof and a hydroxide of a metal other than cerium.

Preferred forms of the hydroxide of a metal other than cerium are as described above.

Further, the component (B) may be in a form comprising one or more selected from the group consisting of cerium oxide, cerium hydroxide, and hydrates thereof and a hydroxide of an alkali earth metal, still further, may be in a form comprising one or more selected from the group consisting of cerium oxide and hydrates thereof and one or more selected from the group consisting of magnesium hydroxide and calcium hydroxide, and still further, may be in a form comprising a hydrate of cerium oxide and calcium hydroxide.

When the component (B) contains one or more selected from the group consisting of cerium oxide and hydrates thereof, and a hydroxide of a metal other than cerium, the ratio of these is preferably in the following range, from the viewpoint of obtaining an effect of increasing the crystallization temperature and long-term heat resistance.

The ratio of one or more selected from the group consisting of cerium oxide and hydrates thereof and a hydroxide of a metal other than cerium by mass is in the range of preferably 1:0.0008 to 1:1, more preferably 1:0.0008 to 1:0.8, and further preferably 1:0.008 to 1:0.08.

The polyimide resin composition of the present invention may contain, as an antioxidant component other than the component (B1) or component (B2), an antioxidant component other than those described above, for example, a known phenol-based antioxidant, phosphorus-based antioxidant, or the like. However, from the viewpoint of obtaining excellent long-term heat resistance, a smaller content of these antioxidants is more preferred. For example, the content of the phenol-based antioxidant, as the content in the polyimide resin composition of the present invention, is preferably less than 1 mass %, more preferably 0.5 mass % or less, further preferably 0.1 mass % or less, and still further preferably 0.01 mass % or less.

When the component (B) contains the component (B1), the content of the component (B) in the polyimide resin composition of the present invention is not particularly limited as long as the content of the component (B1) in the polyimide resin composition is preferably the range, and is preferably 0.005 to 5 mass %, more preferably 0.005 to 3 mass %, and further preferably 0.01 to 2 mass %. When the content of the component (B) in the polyimide resin composition is 0.005 mass % or more, the effect of increasing the crystallization temperature and long-term heat resistance are good. When the content is 5 mass % or less, the hue and mechanical properties derived from the component (A) are likely to be maintained.

When the component (B) contains the component (B2), the content of the component (B) in the polyimide resin composition of the present invention is not particularly limited as long as the content of the component (B2) in the polyimide resin composition is preferably the range, and is preferably 0.05 to 20 mass %, more preferably 0.5 to 18 mass %, further preferably 2 to 15 mass %, and still further preferably 5 to 15 mass %. When the content of the component (B) in the polyimide resin composition is 0.05 mass % or more, the effect of increasing the crystallization temperature and long-term heat resistance are good. When the content is 20 mass % or less, the hue and mechanical properties derived from the component (A) are likely to be maintained.

As described above, in the polyimide resin composition of the present invention, the antioxidant (B) containing the particular copper compound (B1) or cerium-containing compound (B2) enables the crystallization temperature to increase, allows moldability and heat resistance to be improved, and additionally allows the long-term heat resistance of the resulting molded article to be markedly improved. In particular, when the antioxidant (B) contains the particular copper compound (B1), the effect of increasing the crystallization temperature and the effect of improving the long-term heat resistance are more excellent.

<Additive>

In the polyimide resin composition of the present invention, additives may be mixed as required, such as a filler, a delusterant, a nucleating agent, a plasticizer, an antistatic agent, an anti-coloring agent, an anti-gelling agent, a colorant, a slidability-improving agent, a conducting agent, a flame retardant, and a resin-modifying agent.

The amount of the above additive mixed is not particularly limited, and usually 50 mass % or less, preferably 0.0001 to 30 mass %, more preferably 0.001 to 15 mass %, and further preferably 0.01 to 10 mass % in the polyimide resin composition from the viewpoint of expressing the effect of the additive while maintaining the physical properties derived from the polyimide resin (A).

Another resin other than the polyimide resin (A) may also be mixed in the polyimide resin composition of the present invention, without impairing the characteristics of the composition. As the another resin, a high-heat resistant thermoplastic resin is preferred, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polysulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable from the viewpoint of heat resistance, molding processability, strength, and solvent resistance, and a polyphenylene sulfide resin is more preferable from the viewpoint of achievement of high flame retardancy.

When the polyimide resin (A) is used in combination with another resin, the rate of such another resin to be mixed is not particularly limited, without impairing the characteristics of the polyimide resin composition.

However, the total content of the polyimide resin (A) and the antioxidant (B) in the polyimide resin composition of the present invention is preferably 50 mass % or more, more preferably 70 mass % or more, and further preferably 80 mass % or more from the viewpoint of achievement of the effect of the present invention. The upper limit thereof is 100 mass %.

The polyimide resin composition of the present invention may have any form but is preferably pellets.

The polyimide resin composition of the present invention and the polyimide resin (A) to be used therefor have thermoplasticity. Thus, for example, the polyimide resin (A), the antioxidant (B), and various arbitrary components, if necessary, are added and dry blended. Thereafter, the resulting mixture is melt-kneaded in an extruder, the melt-kneaded product is extruded into a strand, and the strand can be cut into pellets. Alternatively, the pellets are introduced in various kinds of molding machines and heat-molded by a method described below, thereby being easily produced into a molded article having a desired shape.

[Molded Article]

The present invention provides a molded article including the polyimide resin composition.

Since the polyimide resin composition of the present invention has thermoplasticity, the molded article of the present invention can be easily produced also by heat-molding the polyimide resin composition. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. For example, injection molding can be performed at a molding temperature of 360° C. or less and a mold temperature of 220° C. or less, and is preferable in that molding can performed at a relatively low temperature.

The method for producing a molded article preferably includes the step of heat-molding the polyimide resin composition at from 290 to 350° C. Examples of specific procedures include the following method.

First, the antioxidant (B) and various arbitrary components, if necessary, are added to the polyimide resin (A) and dry blended. Thereafter, the resulting mixture is introduced into an extruder, and molten preferably at from 290 to 350° C. The molten product is melt-kneaded in the extruder and extruded, thereby producing pellets. Alternatively, the polyimide resin (A) may be introduced into an extruder and molten preferably at from preferably 290 to 350° C., and the antioxidant (B) and various arbitrary components may be introduced thereto, melt-kneaded with polyimide resin (A) in the extruder, and extruded, thereby producing the pellets.

The pellets may be dried, then introduced in various kinds of molding machines, and heat-molded preferably at from 290 to 350° C., thereby producing a molded article having a desired shape.

Since the polyimide resin composition of the present invention may be heat-molded by extrusion molding or the like at a relatively low temperature of from 290 to 350° C., the polyimide resin composition is excellent in molding processability and may be easily produced into a molded product having a desired shape. The temperature of the heat molding is preferably from 310 to 350° C.

The polyimide resin composition of the present invention and the molded article including the molding material have excellent long-term heat resistance and can be applied, for example, in various industrial members, enclosures for industrial machines, members for communication devices, members for household electrical products such as gears, bearings, screws, nuts, packings, IC sockets for inspection, belts and enclosures, covering materials for electrical wire and the like, cover-lay films, members for automobiles, members for railway, aviation applications, medical instruments, enclosures for fishing rods, reels, and the like, stationery, and the like.

EXAMPLES

The present invention will be described in more detail with reference to examples below, but the present invention is not limited thereto. Various measurements and evaluations in each Production Example, and Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$$\mu=\ln(ts/t_0)/C$$

$t_0$: elapsed time for flowing concentrated sulfuric acid
ts: elapsed time for flowing polyimide resin solution
C: 0.5 g/dL <Melting Point, Glass Transition Temperature, Crystallization Temperature, and Exothermic Amount of Crystallization>

The melting point (Tm), the glass transition temperature (Tg), the crystallization temperature (Tc), and the exothermic amount of crystallization (ΔHm) of the polyimide resin and the polyimide resin composition were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

Under a nitrogen atmosphere, a polyimide resin was held at 420° C. for 10 minutes for melting the polyimide resin completely and then quenched at a cooling rate of 70° C./min, during which the time required from the appearance of the crystallization peak observed to the peak top thereof was calculated. In Table 1, the case where the crystallization half-time was 20 seconds or less was denoted by "<20".

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Hue>

Pellets of 3 to 4 mm in length and 0.7 to 1.2 mm in diameter made of the polyimide resin composition of each of Examples were produced by the method described below. After the pellets were dried at 190° C. for 10 hours, the Lab value and the YI value were measured with a colorimeter ("ZE2000" produced by NIPPON DENSHOKU INDUSTRIES CO., LTD Denshoku.) by reflectometry. The whiteness was calculated based on the Lab value and the YI value. The Lab value was measured by a method according to JIS Z8781-4:2013, the YI value was measured by a method according to JIS K7373:2006, and the whiteness was measured by a method according to JIS Z8715:1999.

The whiteness was evaluated in accordance with the following criteria.

G: Whiteness of 30 or more
F: Whiteness less than 30

<Relative Permittivity and Dielectric Loss Tangent (tan δ)>

The polyimide resin composition produced in each Example was used for injection molding by the method described below. Then, the injection-molded product was cut to prepare a molded article of 1.5 mm×80 mm×1.5 mm in thickness. The molded article was conditioned at a temperature of 23° C. and a humidity of 50% for 48 hours and used for measurement. The relative permittivity and the dielectric loss tangent (tan δ) were measured with "PNA-L Network Analyzer N5230A" produced by Agilent Technologies Japan, Ltd. and a cavity resonator "CP531" produced by KANTO Electronic Application and Development Inc. as measurement apparatuses according to IEC 62810 by a cavity resonator perturbation method at a temperature of 23° C., a humidity of 50%, and a measurement frequency of 10 GHz. The average value of n=2 was taken as the measurement value.

<Heat Deformation Temperature (HDT)>

The polyimide resin composition produced in each of Examples was used for injection molding by the method described below. Then, the injection-molded product was cut to prepare a molded article of 80 mm×10 mm×4 mm in thickness, which was used for measurement. A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

<Bending Strength and Flexural Modulus>

(Measurement of Molded Article Immediately After Preparation)

The polyimide resin composition produced in each of Examples was used to prepare a molded article of 80 mm×10 mm×4 mm in thickness prescribed in ISO 316 by the method described below, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

The bending strength was evaluated in accordance with the following criteria.

G: The bending strength is in the range of ±8 MPa with respect to the value of the bending strength (MPa) of the molded article of Comparative Example 1, which is made of only the polyimide resin.
F: The bending strength is out of the range described above.

(Measurement of Molded Article After Storage at 170° C.)

The molded article prepared by the above method was stored in an oven at 170° C. for a predetermined time and then stored in the constant humidity chamber of a constant temperature oven at a temperature of 25° C. and a humidity of 50% for 24 hours or more. Thereafter, the bending strength and the flexural modulus were measured according to the same method described above. The storage time is as shown in Tables 2 and 3.

(Measurement of Molded Article After Storage at 200° C.)

The molded article prepared by the above method was stored in an oven at 200° C. for a predetermined time and then stored in the constant humidity chamber of a constant temperature oven at a temperature of 25° C. and a humidity of 50% for 24 hours or more. Thereafter, the bending strength and the flexural modulus were measured according to the same method described above. The storage time is as shown in Table 3.

<Bending Strength Retention>

The bending strength retention of the molded article after storage at 170° C. or the molded article after storage at 200° C. was determined by the following expression. A higher retention means that the molded article is more excellent in long-term heat resistance.

Bending strength retention (%)=(bending strength of molded article after storage at 170° C. or molded article after storage at 200° C./bending strength of molded article immediately after preparation)×100

The bending strength retention was evaluated in accordance with the following criteria. Requiring a longer time until the criterion C is reached means being more excellent in the long-term heat resistance.

A: Bending strength retention of 75% or more

B: Bending strength retention of 50% or more and less than 75%

C: Bending strength retention less than 50%

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy) ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy) ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring ν(C═O) observed at 1768 and 1697 ($cm^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in total tetracarboxylic acid components) | Diamine component (mol % in total diamine components) | | (1)/{(1) + (2)} | Tm | Tg | Tc | Exothermic amount of crystallization ΔHm | Crystallization half-time | |
|---|---|---|---|---|---|---|---|---|---|---|---|
| | | PMDA | 1,3-BAC | OMDA | (mol %)*1 | (° C.) | (° C.) | (° C.) | (mJ/mg) | (seconds) | Mw |
| Production Example 1 | Polyimide resin 1 | 100 | 35 | 65 | 35 | 323 | 184 | 266 | 21.0 | <20 | 55,000 |

*1 The content ratio (mol %) of the repeating structural unit of the formula (1) with respect to the total of the repeating structural unit of the formula (1) and the repeating structural unit of the formula (2) in the polyimide resin 1

Abbreviations in the Table 1 are as follows.

PMDA; pyromellitic dianhydride 1,3-BAC; 1,3-bis(aminomethyl)cyclohexane

OMDA; 1,8-octamethylenediamine

Examples 1 to 9 and Comparative Examples 1 to 2 (Production and Evaluation of Polyimide Resin Composition)

The polyimide resin 1 obtained in Production Example 1 and the components each shown in Table 2 and Table 3 were sufficiently mixed by dry blend. The resulting mixed powder was extruded at a barrel temperature of 350° C. and a screw rotation speed of 70 rpm with Labo Plastomill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.). The resulting pellets were dried at 190° C. for 10 hours and then used in injection molding.

The injection molding was performed at a barrel temperature of 350° C., a mold temperature of 200° C., and a molding cycle of 50 seconds with an injection molding machine ("ROBOSHOT α-S30iA", produced by FANUC CORPORATION), thereby preparing a molded article of a predetermined shape to be used for various evaluations.

The obtained pellets or molded article was used to perform various evaluations mentioned above. The results are shown in Table 2 and Table 3.

TABLE 2

| | | | | | Example | | | | | Comparative Example | |
|---|---|---|---|---|---|---|---|---|---|---|---|
| | | | | | 1 | 2 | 3 | 4 | 5 | 1 | 2 |
| Composition blend | (A) | | Polyimide resin 1 | mass % | 99.98 | 99.84 | 97.98 | 99.86 | 99.86 | 100 | 99 |
| | (B) | | CuI | mass % | 0.02 | 0.02 | 0.02 | | | | |
| | | | 201FF Stabilizer (KI/CuI/Zn Stearate = 80/10/10) | mass % | | 0.14 | | 0.14 | | | |
| | | | HS-06FF (KBr/CuI/Zn Stearate = 80/10/10) | mass % | | | | | 0.14 | | |
| | | | Fe(III) Stearate | mass % | | | 2 | | | | |
| | | | Irganox1010 | mass % | | | | | | | 1 |
| Total | | | | mass % | 100 | 100 | 100 | 100 | 100 | 100 | 100 |
| Content of component (B) in composition | | | | mass % | 0.02 | 0.16 | 2.02 | 0.14 | 0.14 | 0 | 1 |
| Content of component (B1) in composition | | | | mass % | 0.020 | 0.034 | 0.020 | 0.014 | 0.014 | 0 | 0 |
| Content of component (B1) in component (B) | | | | mass % | 100 | 21.3 | 0.99 | 10.0 | 10.0 | 0 | 0 |
| Evaluation results | Basic physical properties | Hue | L | — | 39.8 | 31.9 | 16.1 | 31.4 | 32.6 | 48.1 | 39.7 |
| | | | a | — | 3.2 | 2.4 | 0.4 | 3.2 | 2.9 | 6.3 | 3.8 |
| | | | b | — | 13.3 | 10.0 | 0.2 | 9.9 | 9.8 | 17.8 | 15.9 |
| | | | YI | — | 61.4 | 61.4 | 3.8 | 64.3 | 60.7 | 75.8 | 78.7 |
| | | | Whiteness | — | 38.3 | 31.2 | 16.0 | 30.6 | 31.8 | 44.7 | 37.5 |
| | | | Whiteness evaluation | — | G | G | F | G | G | G | G |
| | | Thermal physical properties | Tm | ° C. | 323 | 324 | 324 | 323 | 324 | 324 | 323 |
| | | | Tg | ° C. | 187 | 188 | 185 | 186 | 188 | 187 | 181 |
| | | | Tc | ° C. | 277 | 279 | 279 | 280 | 279 | 269 | 271 |
| | | | ΔHm | mJ/mg | 20.3 | 19.7 | 17.0 | 22.5 | 19.7 | 22.6 | 18.3 |
| | | | Relative permittivity εr (10 GHz) | — | — | — | 2.68 | 2.72 | — | 2.66 | — |
| | | | Dielectric loss tangent tanδ (10 GHz) | — | — | — | 0.0048 | 0.0047 | — | 0.0039 | — |
| | | | Flexural modulus | GPa | 2.5 | 2.4 | 2.5 | 2.5 | 2.5 | 2.4 | 2.7 |
| | | | Bending strength | MPa | 118 | 117 | 123 | 118 | 122 | 120 | 128 |
| | | | Bending strength evaluation | — | G | G | G | G | G | — | G |
| | Long-term heat resistance at 170° C. | 42 d (1008 hr) | Flexural modulus | GPa | 2.7 | 2.7 | 2.8 | 2.7 | 2.7 | 2.5 | 2.7 |
| | | | Bending strength | MPa | 119 | 118 | 111 | 124 | 123 | 55 | 98 |
| | | | Bending strength retention | % | 101 | 101 | 90 | 105 | 101 | 46 | 77 |
| | | 84 d (2016 hr) | Flexural modulus | GPa | 2.7 | 2.8 | 2.8 | 2.8 | 2.6 | 2.6 | 2.4 |
| | | | Bending strength | MPa | 92 | 99 | 94 | 107 | 85 | 26 | 37 |
| | | | Bending strength retention | % | 78 | 85 | 77 | 91 | 70 | 22 | 29 |
| | | 126 d (3024 hr ) | Flexural modulus | GPa | 2.6 | 2.6 | 2.7 | 2.6 | 2.7 | 2.9 | 2.4 |
| | | | Bending strength | MPa | 57 | 83 | 78 | 83 | 76 | 23 | 32 |
| | | | Bending strength retention | % | 48 | 71 | 64 | 70 | 62 | 19 | 25 |
| | | 168 d (4032 hr ) | Flexural modulus | GPa | 2.6 | 2.7 | 2.8 | 2.7 | 2.7 | — | — |
| | | | Bending strength | MPa | 42 | 67 | 63 | 62 | 63 | — | — |
| | | | Bending strength retention | % | 36 | 57 | 51 | 53 | 52 | — | — |
| | | 210 d (5040 hr) | Flexural modulus | GPa | — | 2.7 | 2.9 | 2.8 | 2.8 | — | — |
| | | | Bending strength | MPa | — | 61 | 67 | 59 | 62 | — | — |
| | | | Bending strength retention | % | — | 52 | 55 | 50 | 51 | — | — |
| | | 252 d (6048 hr) | Flexural modulus | GPa | — | 2.8 | 3.0 | 2.8 | 2.8 | — | — |
| | | | Bending strength | MPa | — | 64 | 58 | 63 | 55 | — | — |
| | | | Bending strength retention | % | — | 55 | 47 | 53 | 45 | — | — |
| | | 410 d (10080 hr) | Flexural modulus | GPa | — | 3 | — | 3 | — | — | — |
| | | | Bending strength | MPa | — | 35 | — | 36 | — | — | — |
| | | | Bending strength retention | % | — | 30 | — | 31 | — | — | — |
| | | Bending strength retention evaluation | 1008 hr | — | A | A | A | A | A | C | A |
| | | | 2016 hr | — | A | A | A | A | B | C | C |
| | | | 3024 hr | — | C | B | B | B | B | C | C |
| | | | 4032 hr | — | C | B | B | B | B | — | — |
| | | | 5040 hr | — | — | B | B | B | B | — | — |
| | | | 6048 hr | — | — | B | C | B | C | — | — |
| | | | 10080 hr | — | — | C | — | C | — | — | — |

TABLE 3

| | | | | | Example | | | | Comparative Example |
|---|---|---|---|---|---|---|---|---|---|
| | | | | | 6 | 7 | 8 | 9 | 1 |
| Composition blend | (A) | | Polyimide resin 1 | mass % | 99 | 96.5 | 93 | 92.86 | 100 |
| | (B) | | Cerium Hydrate 90 | mass % | 1 | 3.5 | 7 | 7 | |
| | | | Calcium Hydroxide | mass % | | | | 0.14 | |
| | Total | | | mass % | 100 | 100 | 100 | 100 | 100 |
| | Content of component (B) in composition | | | mass % | 1 | 3.5 | 7 | 7.14 | 0 |
| | Content of component (B2) in composition | | | mass % | 1 | 3.5 | 7 | 7 | 0 |
| | Content of component (B2) in component (B) | | | mass % | 100 | 100 | 100 | 98 | 0 |
| Evaluation results | Basic physical properties | Hue | L | — | 36.1 | 33.5 | 34.3 | 35.6 | 48.1 |
| | | | a | — | 3.9 | 0.64 | 0.64 | 0.78 | 6.3 |
| | | | b | — | 9.7 | 4.2 | 3.6 | 4.0 | 17.8 |
| | | | YI | — | 56.2 | 24.1 | 20.3 | 21.7 | 75.8 |
| | | | Whiteness | — | 35.2 | 33.4 | 34.2 | 35.5 | 44.7 |
| | | | Whiteness evaluation | — | G | G | G | G | G |
| | | Thermal physical properties | Tm | ° C. | 321 | 321 | 322 | 322 | 324 |
| | | | Tg | ° C. | 184 | 183 | 181 | 188 | 187 |
| | | | Tc | ° C. | 273 | 273 | 270 | 270 | 269 |
| | | | ΔHm | mJ/mg | 25.9 | 25.7 | 25.0 | 25.5 | 22.6 |
| | | | HDT | ° C. | 172.9 | 172.0 | 169.7 | 171.2 | 174.3 |
| | | Relative permittivity εr (10 GHz) | | — | — | — | — | — | 2.66 |
| | | Dielectric loss tangent tanδ (10 GHz) | | — | — | — | — | — | 0.0039 |
| | | | Flexural modulus | GPa | 2.4 | 2.4 | 2.4 | 2.4 | 2.4 |
| | | | Bending strength | MPa | 113 | 112 | 112 | 112 | 120 |
| | | | Bending strength evaluation | — | G | G | G | G | — |
| | Long-term heat resistance at 170° C. | 14 d (336 hr) | Flexural modulus | GPa | 2.0 | 2.3 | 2.4 | 2.4 | 2.5 |
| | | | Bending strength | MPa | 119 | 130 | 132 | 119 | 110 |
| | | | Bending strength retention | % | 105 | 116 | 118 | 107 | 91 |
| | Long-term heat resistance at 200° C. | 7 d (168 hr) | Flexural modulus | GPa | 2.4 | 2.4 | 2.5 | 2.5 | — |
| | | | Bending strength | MPa | 88 | 121 | 119 | 110 | — |
| | | | Bending strength retention | % | 78 | 108 | 106 | 98 | — |
| | | 14 d (336 hr) | Flexural modulus | GPa | 2.5 | 2.4 | 2.5 | 2.6 | 2.8 |
| | | | Bending strength | MPa | 47 | 87 | 99 | 92 | 33 |
| | | | Bending strength retention | % | 41 | 78 | 88 | 82 | 27 |
| | | 21 d (504 hr) | Flexural modulus | GPa | 2.6 | 2.5 | 2.5 | 2.6 | — |
| | | | Bending strength | MPa | 39 | 54 | 71 | 68 | — |
| | | | Bending strength retention | % | 34 | 48 | 63 | 61 | — |
| | | 42 d (1008 hr) | Flexural modulus | GPa | 2.7 | 2.6 | 2.6 | 2.4 | — |
| | | | Bending strength | MPa | 33 | 31 | 41 | 30 | — |
| | | | Bending strength retention | % | 29 | 28 | 36 | 26 | — |
| | | Bending strength retention evaluation | 168 hr | — | A | A | A | A | — |
| | | | 336 hr | — | C | A | A | A | C |
| | | | 504 hr | — | C | C | B | B | — |
| | | | 1008 hr | — | C | C | C | C | — |

The details of each components shown in Table 2 and Table 3 are as follows.

<Polyimide Resin (A)>

Polyimide resin 1: Polyimide resin 1 obtained in Production Example 1, Mw: 55,000

<Antioxidant (B)>

CuI: produced by NIHON KAGAKU SANGYO CO., LTD.

201FF Stabilizer: produced by PolyAd Services GmbH, antioxidant, KI/CuI/Zn Stearate=80/10/10 (mass ratio)

HS-06FF: produced by PolyAd Services GmbH, antioxidant, KBr/CuI/Zn Stearate=80/10/10 (mass ratio)

Fe(III) Stearate: produced by Tokyo Chemical Industry Co., Ltd.

Irganox 1010: produced by BASF Japan Ltd., phenol-based antioxidant, pentaerythritol tetrakis[3-(3,5-di-tert-butyl-4-hydroxyphenyl)propionate]

Cerium Hydrate 90: produced by Treibacher Industrie AG, antioxidant, $CeO_2 \cdot nH_2O$ (hydrate of cerium oxide (IV), $CeO_2$ content: 93 mass %)

Calcium Hydroxide: produced by FUJIFILM Wako Pure Chemical Corporation, antioxidant, $Ca(OH)_2$ (calcium hydroxide)

As shown in Table 2, the polyimide resin compositions of Examples 1 to 5 each containing the polyimide resin (A) and the particular copper compound (B1) as the antioxidant were able to increase the crystallization temperature while maintaining the mechanical properties in the case of the polyimide resin (A) singly (Comparative Example 1) and additionally able to markedly improve the long-term heat resistance at 170° C. On the other hand, the polyimide resin composition of Comparative Example 2, in which the phenol-based antioxidant was singly used as the antioxidant had no increase in the crystallization temperature and, also as for long-term heat resistance at 170° C., resulted in a bending strength retention after 2,000 hours passed falling below 50%.

As shown in Table 3, the polyimide resin compositions of Examples 6 to 9 each containing the polyimide resin (A) and the cerium-containing compound (B2) as the antioxidant were able to increase the crystallization temperature while maintaining the mechanical properties in the case of the polyimide resin (A) singly (Comparative Example 1) and additionally able to markedly improve the long-term heat resistance at 200° C.

INDUSTRIAL APPLICABILITY

The polyimide resin composition of the present invention has excellent long-term heat resistance and a high crystallization temperature and thus also has good molding processability and productivity on heat molding. The polyimide resin composition of the present invention can be applied, for example, in various industrial members, enclosures for industrial machines, members for communication devices, members for household electrical products such as gears, bearings, screws, nuts, packings, IC sockets for inspection, belts and enclosures, covering materials for electrical wire and the like, cover-lay films, members for automobiles, members for railway, aviation applications, medical instruments, enclosures for fishing rods, reels, and the like, stationery, and the like.

The invention claimed is:

1. A polyimide resin composition, comprising:

a polyimide resin (A); and an antioxidant (B), wherein a total content of the polyimide resin (A) and the antioxidant (B) in the polyimide resin composition is at least 80 mass %, wherein the polyimide resin (A) comprises a repeating structural unit of the following formula (1) and a repeating structural unit of the following formula (2), (1)

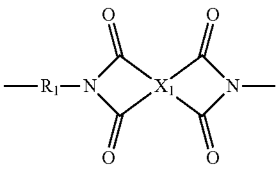

(2)

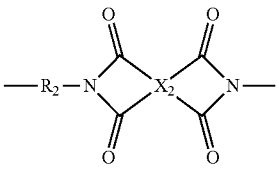 , wherein $R_1$ represents a divalent group having from 6 to 22 carbon atoms and comprising an alicyclic hydrocarbon structure, $R_2$ represents a divalent chain aliphatic group having from 5 to 16 carbon atoms, $X_1$ and $X_2$ each independently represents a tetravalent group having from 6 to 22 carbon atoms and comprising an aromatic group, and a content ratio of the repeating structural unit of the formula (1) with respect to a total of the repeating structural unit of the formula (1) and the repeating structural unit of the formula (2) is from 20 mol % to 35 mol %, and wherein the antioxidant (B) comprises copper iodide as the copper compound (B1), and a combination of the halide of a metal other than copper and the carboxylate of a metal other than copper as an additional antioxidant, wherein a content of the copper component (B1) in the polyimide resin composition is from 0.001 to 0.1 mass %, a content of the copper compound (B1) in the antioxidant (B) is 21.3 mass % or more based on a total mass of the antioxidant (B), and a total content of the antioxidant (B) in the polyimide resin composition is from 0.005 to 0.16 mass %.

2. The polyimide resin composition of claim 1, wherein the antioxidant (B) comprises less than 1 mass % of a phenol-based antioxidant.

3. A molded article, comprising:

the polyimide resin composition of claim 1.

4. The polyimide resin composition of claim 1, wherein the halide of a metal other than copper is at least one selected from the group consisting of KI and KBr, and the carboxylate of a metal other than copper is at least one selected from the group consisting of Zn stearate and Fe(III) stearate.

5. A polyimide resin composition, comprising:

a polyimide resin (A); and an antioxidant (B), wherein the polyimide resin (A) comprises a repeating structural unit of the following formula (1) and a repeating structural unit of the following formula (2), (1)

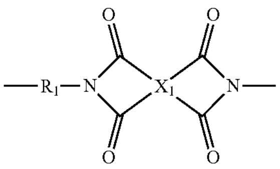

(2)

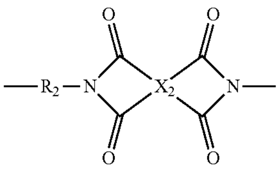 , wherein $R_1$ represents a divalent group having from 6 to 22 carbon atoms and comprising an alicyclic hydrocarbon structure, $R_2$ represents a divalent chain aliphatic group having from 5 to 16 carbon atoms, $X_1$ and $X_2$ each independently represents a tetravalent group having from 6 to 22 carbon atoms and comprising an aromatic group, and a content ratio of the repeating structural unit of the formula (1) with respect to a total of the repeating structural unit of the formula (1) and the repeating structural unit of the formula (2) is from 20 mol % to 35 mol %, and wherein the antioxidant (B) comprises a cerium-containing compound (B2) which comprises at least one selected from the group consisting of cerium oxide and a hydrate thereof and is included at a content of from 2 to 13 mass %, and a hydroxide of a metal other than cerium, where a mass ratio of the at least one selected from the group consisting of cerium oxide and a hydrate to the hydroxide of a metal other than cerium, (the at least one selected from the group consisting of cerium oxide and a hydrate): (the hydroxide of a metal other than cerium), is from 1:0.0008 to 1:1.

6. The polyimide resin composition of claim 5, wherein the antioxidant (B) comprises at least 50 mass % of the cerium-containing compound (B2).

7. The polyimide resin composition of claim 5, wherein the antioxidant (B) includes less than 1 mass % of a phenol-based antioxidant.

8. A molded article, comprising:

the polyimide resin composition of claim 5.

9. The polyimide resin composition according to claim 5, wherein a total content of the polyimide resin (A) and the antioxidant (B) in the polyimide resin composition is at least 80 mass %.

* * * * *